United States Patent [19]

Alff

[11] Patent Number: 4,948,277

[45] Date of Patent: Aug. 14, 1990

[54] ROTATING SEAL WITH INTEGRATED MAGNETIC ENCODER FOR A BEARING WITH INFORMATION SENSORS

[75] Inventor: Denis Alff, Annecy

[73] Assignee: The Torrington Company, Torrington, Conn.

[21] Appl. No.: 450,095

[22] Filed: Dec. 13, 1989

[30] Foreign Application Priority Data

Jan. 20, 1989 [FR] France .................. 89 00649

[51] Int. Cl.⁵ .................................................. F16C 32/00
[52] U.S. Cl. .................................... 384/448; 324/174; 384/477
[58] Field of Search ............... 384/448, 446, 544, 545, 384/546, 147, 148, 477; 340/682; 277/80, 182, 181; 324/173, 174, 207.25

[56] References Cited

U.S. PATENT DOCUMENTS 4,525,082 6/1985 Brandenstein et al. ......... 384/147 X
4,732,494 3/1988 Guers et al. ..................... 384/446 X
4,864,231 9/1989 Okumura et al. ............... 384/448 X

FOREIGN PATENT DOCUMENTS 2558223 7/1985 France .
2270470 2/1989 United Kingdom ............... 384/448

Primary Examiner—Daniel P. Stodola
Assistant Examiner—William G. Battista
Attorney, Agent, or Firm—Frank S. Troidl

[57] ABSTRACT

An encoder is mounted on a seal of a bearing having a fixed ring and a radially spaced rotating ring. The encoder ring has circumferentially separated teeth on one of its radial surfaces which embed into an elastomer portion of the seal.

4 Claims, 2 Drawing Sheets

ROTATING SEAL WITH INTEGRATED MAGNETIC ENCODER FOR A BEARING WITH INFORMATION SENSORS

This invention relates to sealed bearings with encoders. More particularly, this invention is a bearing with a rotating seal with an integrated magnetic encoder.

A bearing is known from French Patent No. 2,558,223, in which a sensor and rotating encoder are integrated into a seal. When the encoder consists of a magnetic ring, it is known that it can be mounted in a specific support concentric to the rotating ring of the bearing to preserve the accuracy of the desired information. On the other hand, when the encoder is made of a moldable material, such as plastoferrite, the mounting and fixation of the encoder can be difficult, and it can also be difficult to manufacture, since its physical and mechanical properties are somewhat incompatible with a steel environment.

An object of this invention is to provide a bearing with a rotating seal with the molded encoder embedded in the seal and is situated between two rings, one of which supports the seal while the other supports the sensor.

According to the invention, the encoder has means for axial, radial, and angular retention and a thrust surface so that it can be locked onto a cylindrical contact surface of the seal and positioned against a facing thrust surface of the seal.

The retaining means is constructed to give great resistance to shock and vibration and allow relative dimensional variations of the encoder with respect to the environment under the effect of differential rates of expansion.

The seal, constructed in this manner, also makes it possible to isolate the sensor and encoder from pollutants on the outside or inside of the bearing, while also simplifying the mounting of the encoder in the seal.

The invention, as well as its many advantages, may be further understood by reference to the following detailed description and drawings in which.

Figure 1:
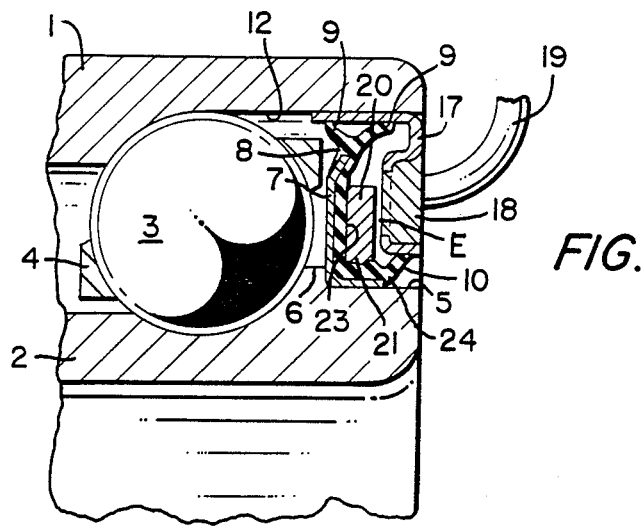
FIG. 1 shows an axial cross-section of a part of a bearing isolated by a seal placed between an inner rotating ring and a fixed outer ring.
Figure 2:
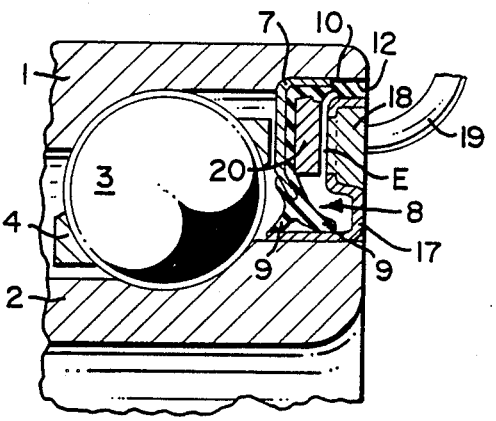
FIG. 2 is an axial cross-section of a part of a bearing isolated by a seal placed between a fixed inner ring and a rotating outer ring.
Figure 3:
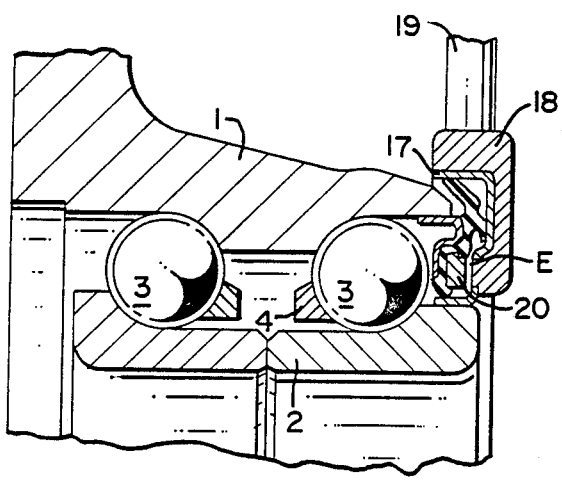
Figure 4:
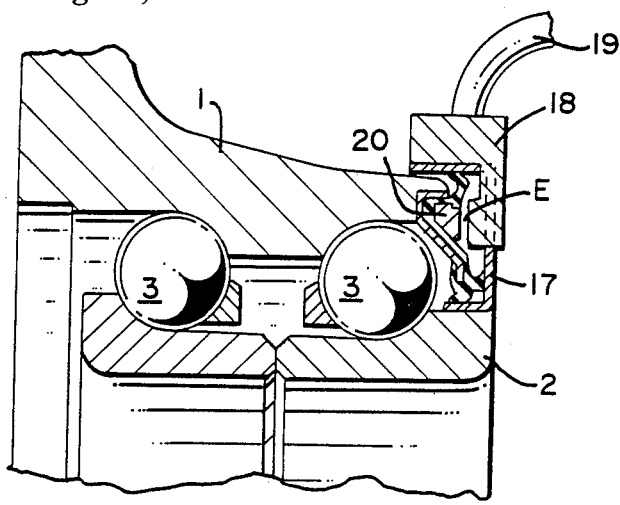
Figures 5, 6:
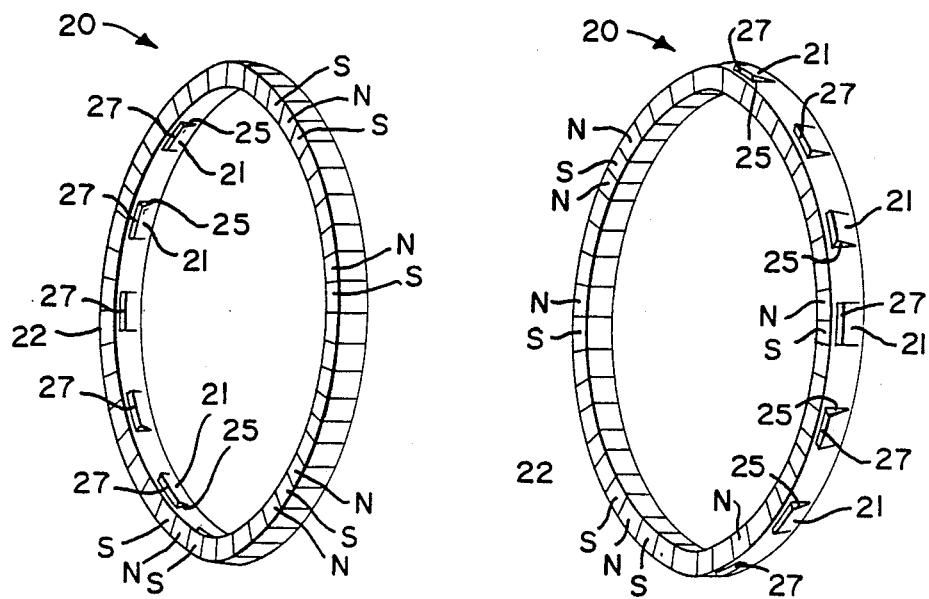

FIGS. 3 and 4 show applications of the seal to bearings for the wheels of a vehicle not connected to the drive train; and FIGS. 5 and 6 illustrate the encoders in FIGS. 1 and 2.

In the various figures, like numbers refer to like parts.

The bearings shown in the figures have an outer ring 1 and an inner ring 2. Either the outer ring or the inner ring may be fixed while the other ring rotates, depending on the use of the bearing. Rings 1 and 2 have races for rolling elements 3 held in a cage 4, which keeps them in the proper angular position.

Referring to FIG. 1, rotating ring 2 has a support surface 5 limited axially by a shoulder 6, which absorbs the thrust of brace 7 of the seal. Elastomer 8 is molded onto brace 7, and radial lips 9, 10,, rest on the sensor support 17 which is mounted on support surface 12 of fixed outer ring 1.

A sensor element 18 is lodged in a depression formed in the external surface of support 17, and a lead 19 is provided to transmit the signals to a processing circuit (not shown).

Encoder 20 is mounted on the seal. Between the seal and sensor, element 18 is a predetermined distance "E" that is compatible with the correct transmission of the signals. The seal is positioned in the annulus between the rings 1 and 2. The elastomer 8 has a portion 23 extending along the axially outside surface of the radially extending annular support of the brace and a portion 24 extending along the axially extending cylindrical support of the annular brace.

According to the invention, encoder 20 has stops or teeth 21, which are clearly visible in FIG. 5, distributed circumferentially inside a multipolar magnetic ring 22. The axial positioning of ring 22 is achieved in one direction by thrust surface 23 of the seal. The axial positioning in the other direction and the angular and radial retention are assured by sides 25 and 27 of teeth 21, which engage elastically with cylindrical support surface 24 of the seal.

FIG. 2 shows a variation of the mounting of the seal on a bearing with a rotating outer ring. Outer ring 1 has support surface 12 for brace 7, which in turn supports the elastomer and encoder 20. A shown in FIG. 6, retainer teeth 21 of the encoder are distributed around the outer periphery of ring 22.

In each of the examples described, ring 22, which is provided with teeth or stops 21, is inserted during the process of assembling the seal. For this purpose, ring 22 can be force-fit into the seal. To avoid damaging the seal, it is possible to install ring 22 by shrinking and then expanding it, which can be done if it is made of a plastoferrite material with a high coefficient of expansion.

The axial positioning of the ring is thus reliably achieved by surface 23 of the seal, and this surface cannot be radially or angularly displaced by the penetration of stops or teeth 21 into cylindrical support surface 24.

FIGS. 3 and 4 show variations of the application of the invention to the bearings of the nondriven wheel of a vehicle. In this case, a bearing with two rows of rolling elements 3 has a set of inner fixed rings 2 and an outer rotating ring 1. Sensor 18 and its lead 19 are molded on ring 17 (FIG. 3) or locked in place thereon (FIG. 4). In the latter case, the sensor can be installed after the bearing has been mounted. Encoder 20 is attached to the seal as described in connection with FIGS. 1 and 2, and tolerance "E" is protected by the sealing system of the bearing, which makes use of a seal with axial and radial lips.

I claim:

1. A bearing comprising: a fixed ring; a rotatable ring radially spaced from the fixed ring to provide an annulus between said rings; a seal positioned at least partially in said annulus, the seal comprising an elastomer molded onto an annular brace, the brace having a radially extending annular support forming a thrust surface and an axially extending cylindrical support, the elastomer having portions extending along the axially outside surface of the annular support of the brace, and along the cylindrical support of the brace; an encoder ring mounted on said seal and having an axially extending surface in contact with the elastomer on the cylindrical support and having a radially extending surface in contact with the elastomer on the annular support; and retainers on said encoder axially extending surface which engages the elastomer on the cylindrical support to axially, radially, and angularly retain the encoder; and a sensor facing the encoder.

2. A bearing in accordance with claim 1, wherein the encoder ring axially extending surface in contact with the elastomer on the cylindrical support is the outside periphery.

3. A bearing in accordance with claim 1, wherein the encoder ring axially extending surface in contact with the elastomer on the cylindrical support is the inside periphery.

4. A bearing in accordance with claim 1, wherein the retainers are teeth embedded in the elastomer.

* * * * *